United States Patent
Ye et al.

(10) Patent No.: US 10,007,168 B2
(45) Date of Patent: Jun. 26, 2018

(54) LIQUID CRYSTAL LENS

(71) Applicant: AU Optronics Corporation, Hsin-Chu (TW)

(72) Inventors: Jia-Hong Ye, Hsin-Chu (TW); Hsueh-Fang Yeh, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days. days.

(21) Appl. No.: 15/431,911

(22) Filed: Feb. 14, 2017

(65) Prior Publication Data
US 2017/0322474 A1 Nov. 9, 2017

(30) Foreign Application Priority Data

May 6, 2016 (TW) .............................. 105114049 A (51) Int. Cl.
*G02F 1/29* (2006.01)
*G03B 13/32* (2006.01)

(52) U.S. Cl.
CPC ............... *G02F 1/29* (2013.01); *G03B 13/32* (2013.01); *G02F 2201/122* (2013.01); *G02F 2202/10* (2013.01)

(58) Field of Classification Search
CPC ...... G02F 1/29; G02F 2201/122; G03B 13/32
See application file for complete search history.

(56) References Cited

U.S. PATENT DOCUMENTS

| 7,619,713 | B2 | 11/2009 | Hashimoto |
| 2007/0183293 | A1 | 8/2007 | Murata et al. |
| 2011/0025955 | A1* | 2/2011 | Bos .................. G02F 1/134309 349/95 |
| 2011/0234954 | A1 | 9/2011 | Hsu et al. |
| 2011/0249206 | A1* | 10/2011 | Liu .................. G02F 1/134309 349/33 |
| 2015/0138498 | A1 | 5/2015 | Lin et al. |

FOREIGN PATENT DOCUMENTS

| CN | 101061419 A | 10/2007 |
| CN | 102338895 B | 11/2013 |
| CN | 103760711 A | 4/2014 |

OTHER PUBLICATIONS

Taiwan Intellectual Property Office, "Office Action", dated Feb. 21, 2017.

* cited by examiner

*Primary Examiner* — Jessica M Merlin
(74) *Attorney, Agent, or Firm* — WPAT, PC (57) ABSTRACT

A liquid crystal lens including a first substrate, a first electrode disposed on the first substrate, a second electrode disposed on the first substrate, a first conductive pattern disposed on the first substrate, a second conductive pattern disposed on the first substrate, a second substrate disposed opposite to the first substrate, a common electrode disposed on the second substrate, and a liquid crystal layer located between the first substrate and the second substrate is provided. The first conductive pattern and the second conductive pattern are electrically connected between the first electrode and the second electrode. A resistivity of the first conductive pattern and a resistivity of the second conductive pattern are greater than a resistivity of the first electrode and a resistivity of the second electrode. At least a portion of the at least one second conductive pattern is disposed into the at least one first conductive pattern.

12 Claims, 8 Drawing Sheets

LIQUID CRYSTAL LENS

BACKGROUND

Technical Field

The present invention relates to a lens, and more particularly to a liquid crystal lens.

Related Art

An electronic apparatus (for example, a mobile phone, and a computer) is usually provided with a camera lens having a focusing function. Generally, for a camera lens, a position of a lens inside the camera lens is usually adjusted by using a voice coil motor (VCM), thereby achieving a focusing effect. The VCM has advantages of a low cost and a small modular thickness, and is therefore widely used. However, a lateral size of the VCM is large, and the VCM is easy to be damaged by external force.

Therefore, persons in the art want to replace a camera lens including a VCM with a liquid crystal (LC) lens. An advantage of an electronic apparatus carrying a liquid crystal lens is that a lateral size of the liquid crystal lens is small and the liquid crystal lens is more power saving than a camera lens including a VCM. However, to meet a focal length requirement of a general camera lens, a pitch between two adjacent electrodes is usually far greater than a cell gap of the liquid crystal lens. For example, an electrode pitch of the liquid crystal lens is approximately several millimeters (mm), whereas the cell gap of the liquid crystal lens is approximately several micrometers (μm). When a difference between the electrode cell gap of the liquid crystal lens and the pitch of the liquid crystal lens is excessively large, distribution of power lines is limited near the electrodes, causing that the liquid crystal lens cannot have desirable optical characteristics.

SUMMARY

The present invention provides a liquid crystal lens, which has desirable optical characteristics.

The liquid crystal lens of the present invention includes a first substrate, a first electrode disposed on the first substrate, a second electrode disposed on the first substrate, at least one first conductive pattern disposed on the first substrate, at least one second conductive pattern disposed on the first substrate, a second substrate disposed opposite to the first substrate, a common electrode disposed on the second substrate, and a liquid crystal layer located between the first substrate and the second substrate. The first conductive pattern and the second conductive pattern are electrically connected between the first electrode and the second electrode. A resistivity of the first conductive pattern and a resistivity of the second conductive pattern are greater than a resistivity of the first electrode and a resistivity of the second electrode. The resistivity of the first conductive pattern and the resistivity of the second conductive pattern are different. The second conductive pattern is distributed within the first conductive pattern. The first conductive pattern and the second conductive pattern are electrically connected to each other.

In an embodiment of the present invention, in the foregoing, the first conductive pattern covers the first electrode and the second electrode, and the resistivity of the first conductive pattern is less than the resistivity of each second conductive pattern.

In an embodiment of the present invention, in the foregoing, the first conductive pattern covers the first electrode and the second electrode, and the resistivity of the first conductive pattern is greater than the resistivity of each second conductive pattern.

In an embodiment of the present invention, in the foregoing, the first conductive pattern has at least one opening; the second conductive pattern is filled in the opening and covers the first conductive pattern, the first electrode, and the second electrode.

In an embodiment of the present invention, in the foregoing, one of the material of the first conductive pattern and the material of the second conductive pattern is an N-doped semiconductor, and the other of the material of the first conductive pattern and the material of the second conductive pattern is an undoped semiconductor.

In an embodiment of the present invention, in the foregoing, the liquid crystal lens further includes a third conductive pattern and a fourth conductive pattern. The fourth conductive pattern is disposed into the third conductive pattern. The third conductive pattern and the fourth conductive pattern are disposed on the first conductive pattern and the second conductive pattern and are electrically connected between the first electrode and the second electrode. A resistivity of the third conductive pattern and a resistivity of the fourth conductive pattern are greater than the resistivity of the first electrode and the resistivity of the second electrode. The resistivity of one of the third conductive pattern and the fourth conductive pattern is less than the resistivity of the other of the third conductive pattern and the fourth conductive pattern. One of the third conductive pattern and the fourth conductive pattern that has a smaller resistivity and one of the first conductive pattern and the second conductive pattern that has a smaller resistivity are staggered, or one of the third conductive pattern and the fourth conductive pattern that has a larger resistivity and one of the first conductive pattern and the second conductive pattern that has a larger resistivity are staggered.

In an embodiment of the present invention, in the foregoing, the material of one of the third conductive pattern and the fourth conductive pattern that has a smaller resistivity is the same as the material of one of the first conductive pattern and the second conductive pattern that has a smaller resistivity.

In an embodiment of the present invention, in the foregoing, the fourth conductive pattern covers the third conductive pattern.

In an embodiment of the present invention, in the foregoing, the first conductive pattern and the second conductive pattern are formed by a same first semiconductor layer, the material of one of the first conductive pattern and the second conductive pattern is an N-doped portion of the first semiconductor layer, and the material of the other of the first conductive pattern and the second conductive pattern is another undoped portion of the first semiconductor layer. The third conductive pattern and the fourth conductive pattern are formed by a same second semiconductor layer, the material of one of the third conductive pattern and the fourth conductive pattern is an N-doped portion of the second semiconductor layer, and the material of the other of the third conductive pattern and the fourth conductive pattern is another undoped portion of the second semiconductor layer.

In an embodiment of the present invention, in the foregoing, the quantity of the at least one second conductive pattern is plural. The multiple second conductive patterns are evenly distributed between the first electrode and the second electrode.

In an embodiment of the present invention, in the foregoing, the quantity of the at least one second conductive pattern is plural. The multiple second conductive patterns are randomly scattered between the first electrode and the second electrode.

In an embodiment of the present invention, in the foregoing, the material of the first conductive pattern includes a metal oxide, an N-doped semiconductor, a low-temperature silicon oxide, a low-temperature nitric oxide or an undoped semiconductor.

Based on the foregoing, in the liquid crystal lens according to the embodiments of the present invention, a first conductive pattern and a second conductive pattern that have high resistance values and different resistivities are electrically connected between a first electrode and a second electrode of the liquid crystal lens. A voltage drop occurs between high-resistance conductive patterns. Therefore, multiple voltage drops may be formed between the first electrode and the second electrode. By using the multiple voltage drops, power lines that are formed in a liquid crystal layer by a voltage difference between the first electrode and the second electrode may be ideally distributed between the first electrode and the second electrode, instead of being easily limited near the first electrode and the second electrode, thereby providing the liquid crystal lens with desirable optical characteristics.

To make the foregoing features and advantages of the present invention more obvious and comprehensible, detailed description is provided below by using the embodiments with reference to the accompanying drawings.

DETAILED DESCRIPTION

Figure 1:
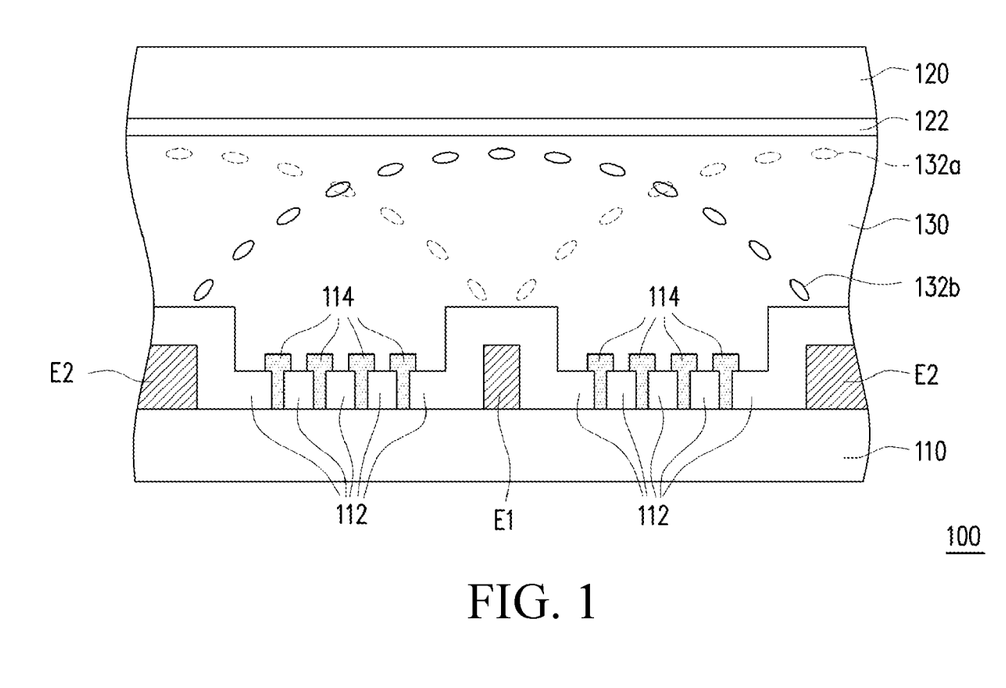
FIG. 1 is a schematic sectional diagram of a liquid crystal lens according to an embodiment of the present invention.

FIG. 1 is a schematic sectional diagram of a liquid crystal lens according to an embodiment of the present invention. Refer to FIG. 1, a liquid crystal lens 100 includes a first substrate 110, a first electrode E1, a second electrode E2, at least one first conductive pattern 112, multiple second conductive patterns 114, a second substrate 120, a common electrode 122, and a liquid crystal layer 130. The first electrode E1 and the second electrode E2 are disposed on the first substrate 110. The second electrode E2 substantially surrounds the first electrode E1. For example, in this embodiment, the first electrode E1 may be disposed on the center of a circle, while the second electrode E2 may be distributed on a circumference of the circle. However, the present invention is not limited thereto. In another embodiment, the first electrode E1 and the second electrode E2 may also another suitable pattern design according to an actual demand. In this embodiment, the first substrate 110 may be a transparent substrate. For example, the material of the first substrate 110 may be glass, quartz, an organic polymer or another suitable material. Based on conductivity consideration, metal materials are generally used for the first electrode E1 and the second electrode E2. However, the present invention is not limited thereto. According to another embodiment, another suitable conductive material may also be used for the first electrode E1 and the second electrode E2, and is, for example, an alloy, a nitride of a metal material, an oxide of a metal material, a nitroxide of a metal material, or a stack layer of a metal material and another conductive material.

Refer to FIG. 1, the second substrate 120 is disposed opposite to the first substrate 110. The common electrode 122 is disposed on the second substrate 120. In this embodiment, the common electrode 122 may completely cover the second substrate 120. However, the present invention is not limited thereto. In another embodiment, the common electrode 122 may also have another suitable pattern. The liquid crystal layer 130 is disposed between the first substrate 110 and the second substrate 120. In this embodiment, for liquid crystal molecules 132a, 132b of the liquid crystal layer 130, nematic liquid crystal molecules may be selected; however, the present invention is not limited thereto. In another embodiment, another suitable type of liquid crystal molecules may also be used for the liquid crystal molecules 132a, 132b of the liquid crystal layer 130. The second substrate 120 may be a transparent substrate. For example, the material of the second substrate 120 may be glass, quartz, an organic polymer or another suitable material. In this embodiment, the common electrode 122 is, for example, a transparent conductive layer, and includes a metal oxide, which is, for example, an indium tin oxide (ITO), an indium zinc oxide, an aluminum tin oxide, an aluminum zinc oxide, an indium germanium zinc oxide, or another appropriate oxide, or a stack layer of at least two of the foregoing.

The first conductive pattern 112 and the second conductive pattern 114 are disposed on the first substrate 110. The second conductive pattern 114 is disposed into the first conductive pattern 112. The first conductive pattern 112 and the second conductive pattern 114 are electrically connected to each other. The first conductive pattern 112 and the second conductive pattern 114 are electrically connected between the first electrode E1 and the second electrode E2. A resistivity of the first conductive pattern 112 and a resistivity of the second conductive pattern 114 are greater than a resistivity of the first electrode E1 and a resistivity of the second electrode E2. In other words, the first conductive pattern 112 and the second conductive pattern 114 both use, for example, a conductive material having a high resistance value.

The resistivity of one of the first conductive pattern 112 and the second conductive pattern 114 is greater than the resistivity of the other of the first conductive pattern 112 and the second conductive pattern 114. Specifically, in this embodiment, the first conductive pattern 112 covers the first electrode E1 and the second electrode E2, and the resistivity of the first conductive pattern 112 may be less than the resistivity of the second conductive pattern 114. For example, the material of the first conductive pattern 112 may be a metal oxide (for example, an ITO that has a smaller resistivity, and the material of the second conductive pattern 114 may be a metal oxide (for example, an indium gallium zinc oxide (IGZO)) that has a larger resistivity. However, the present invention is not limited thereto. In another embodiment, another suitable material may also be selected to fabricate the first conductive pattern 112 and the second conductive pattern 114.

It should be noted that, because the first conductive pattern 112 and the second conductive pattern 114 are electrically connected between the first electrode E1 and the second electrode E2, and the resistivity of one of the first conductive pattern 112 and the second conductive pattern 114 is less than the resistivity of the other of the first conductive pattern 112 and the second conductive pattern 114, at sides of a high-resistance conductive pattern (for example, each second conductive pattern 114 in FIG. 1), voltage drops occur. Therefore, multiple voltage drops may be formed between the first electrode E1 and the second electrode E2. By using the multiple voltage drops, lines of electric force that are formed in the liquid crystal layer 130 by a voltage difference between the first electrode E1 and the second electrode E2 may be ideally distributed between the first electrode E1 and the second electrode E2, to reduce or avoid lines of electric force that are limited near the first electrode E1 and the second electrode E2, thereby providing the liquid crystal lens 100 with desirable optical characteristics.

For example, when a potential of the first electrode E1 is less than a potential of the second electrode E2, the distribution of lines of the electric force that are formed in the liquid crystal layer 130 by a voltage difference between the first electrode E1 and the second electrode E2 may enable optical axes of the liquid crystal molecules 132b of the liquid crystal layer 130 to be arranged in a particular manner, thereby providing the liquid crystal lens 100 with desirable convex lens characteristics. When a potential of the second electrode E2 is less than a potential of the first electrode E1, the distribution of lines of the electric force that are formed in the liquid crystal layer 130 by a voltage difference between the first electrode E1 and the second electrode E2 may enable optical axes of the liquid crystal molecules 132a of the liquid crystal layer 130 to be arranged in another particular manner, thereby providing the liquid crystal lens 100 with desirable concave lens characteristics.

Figure 2:
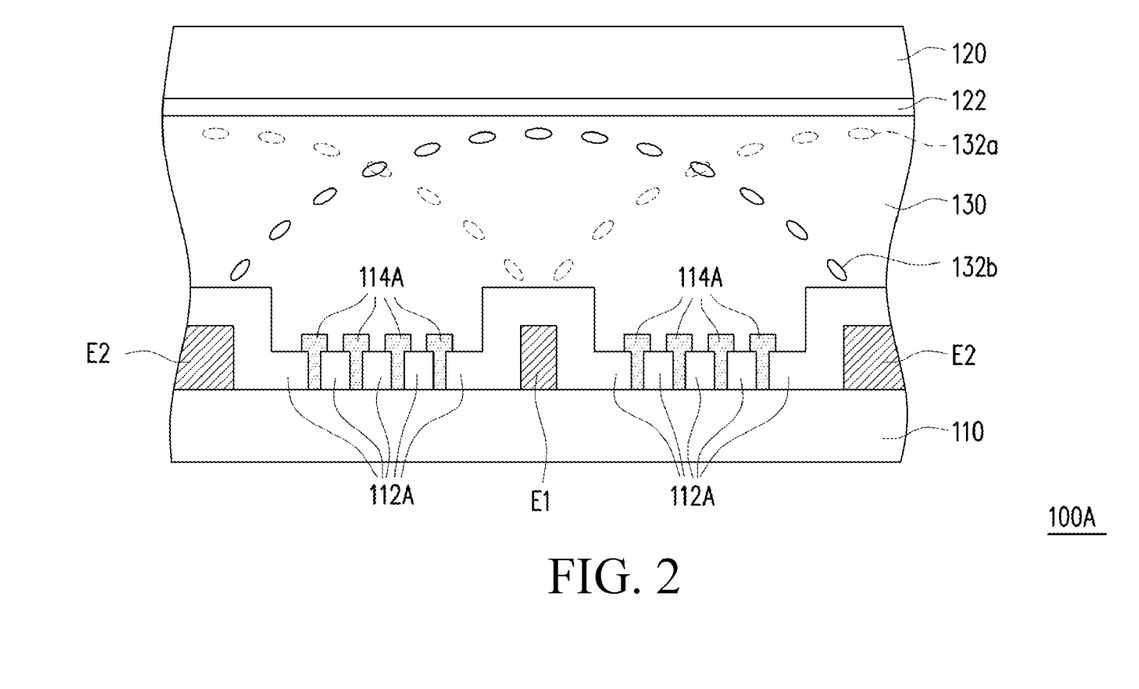
FIG. 2 is a schematic sectional diagram of a liquid crystal lens according to another embodiment of the present invention.

FIG. 2 is a schematic sectional diagram of a liquid crystal lens according to another embodiment of the present invention. Refer to FIG. 2, a liquid crystal lens 100A in FIG. 2 is similar to the liquid crystal lens 100 in FIG. 1, and therefore, the same or corresponding devices are represented by using the same or corresponding reference numerals. A difference between the liquid crystal lens 100A and the liquid crystal lens 100 lies in that: a resistivity of a first conductive pattern 112A, covering a first electrode E1 and a second electrode E2, of the liquid crystal lens 100A is relatively greater than a resistivity of a second conductive pattern 114A of the liquid crystal lens 100A, instead of that the resistivity of the first conductive pattern 112, covering the first electrode E1 and the second electrode E2, of the liquid crystal lens 100 is less than the resistivity of the second conductive pattern 114. This difference is mainly described below, and for the same parts of the two, refer to the foregoing description according to the reference numerals in FIG. 2, which are no longer repeated herein.

Refer to FIG. 2, the liquid crystal lens 100A includes a first substrate 110, the first electrode E1, the second electrode E2, at least one first conductive pattern 112A, multiple second conductive patterns 114A, a second substrate 120, a common electrode 122, and a liquid crystal layer 130. The first electrode E1 and the second electrode E2 are disposed on the first substrate 110. The second electrode E2 substantially surrounds the first electrode E1. The second substrate 120 is disposed opposite to the first substrate 110. The common electrode 122 is disposed on the second substrate 120. The first conductive pattern 112A and the second conductive pattern 114A are disposed on the first substrate 110. The second conductive pattern 114A is disposed into the first conductive pattern 112A. The first conductive pattern 112A and the second conductive pattern 114A are electrically connected to each other. The first conductive pattern 112A and the second conductive pattern 114A are electrically connected between the first electrode E1 and the second electrode E2. The resistivity of the first conductive pattern 112A and the resistivity of the second conductive pattern 114A are greater than a resistivity of the first electrode E1 and a resistivity of the second electrode E2.

The resistivity of one of the first conductive pattern 112A and the second conductive pattern 114A is greater than the resistivity of the other of the first conductive pattern 112A and the second conductive pattern 114A. A difference from the embodiment in FIG. 1 is that the first conductive pattern 112A covers the first electrode E1 and the second electrode E2, and the resistivity of the first conductive pattern 112A is greater than the resistivity of the second conductive pattern 114A. For example, in this embodiment, the material of the first conductive pattern 112A may be a metal oxide (for example, IGZO) that has a larger resistivity, and the material of the second conductive pattern 114A may be a metal oxide (for example, ITO) that has a smaller resistivity. However, the present invention is not limited thereto. In another embodiment, another suitable material may also be selected to fabricate the first conductive pattern 112A and the second conductive pattern 114A. The liquid crystal lens 100A has the same efficiency and advantages as the liquid crystal lens 100 does, which are not repeated herein.

Figure 3:
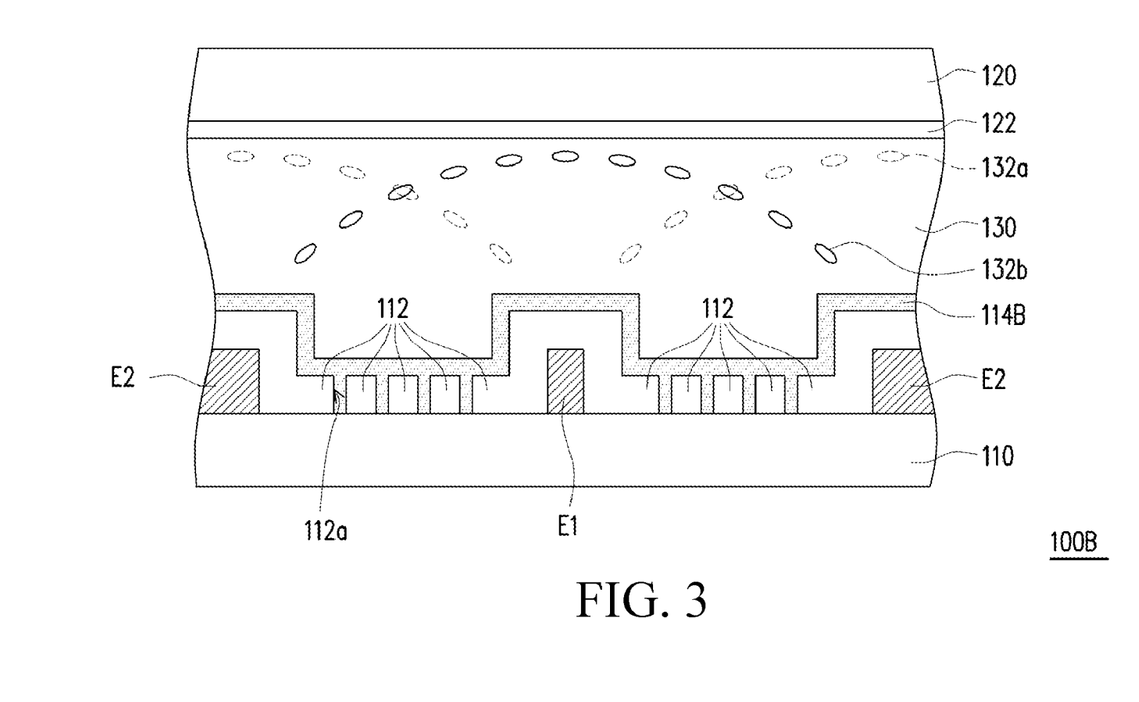
FIG. 3 is a schematic sectional diagram of a liquid crystal lens according to still another embodiment of the present invention.

FIG. 3 is a schematic sectional diagram of a liquid crystal lens according to still another embodiment of the present invention. Refer to FIG. 3, a liquid crystal lens 100B in FIG. 3 is similar to the liquid crystal lens 100 in FIG. 1, and therefore, the same or corresponding devices are represented by using the same or corresponding reference numerals. A difference between the liquid crystal lens 100B and the liquid crystal lens 100 lies in that: in addition to being filled in an opening 112a of a first conductive pattern 112, a second conductive pattern 114B of the liquid crystal lens 100B further covers the first conductive pattern 112. This difference is mainly described below, and for the same parts of the two, refer to the foregoing description according to the reference numerals in FIG. 3, which are not repeated herein.

Refer to FIG. 3, the liquid crystal lens 100B includes a first substrate 110, the first electrode E1, the second electrode E2, at least one first conductive pattern 112, multiple second conductive patterns 114B, a second substrate 120, a common electrode 122, and a liquid crystal layer 130. The first electrode E1 and the second electrode E2 are disposed on the first substrate 110. The second electrode E2 substantially surrounds the first electrode E1. The second substrate 120 is disposed opposite to the first substrate 110. The common electrode 122 is disposed on the second substrate 120. The first conductive pattern 112 and the second conductive pattern 114B are disposed on the first substrate 110. The second conductive pattern 114B is disposed into the first conductive pattern 112. The first conductive pattern 112 and the second conductive pattern 114B are electrically connected to each other. The first conductive pattern 112 and the second conductive pattern 114B are electrically connected between the first electrode E1 and the second electrode E2. A resistivity of the first conductive pattern 112 and a resistivity of the second conductive pattern 114B are greater than a resistivity of the first electrode E1 and a resistivity of the second electrode E2. The resistivity of one of the first conductive pattern 112 and the second conductive pattern 114 is greater than the resistivity of the other of the first conductive pattern 112 and the second conductive pattern 114. The first conductive pattern 112 covers the first electrode E1 and the second electrode E2. In this embodiment, the resistivity of the first conductive pattern 112 may be greater than a resistivity of the second conductive pattern 114; however, the present invention is not limited thereto.

The first conductive pattern 112 has the opening 112a. A difference from the embodiment in FIG. 1 is that in addition to being filled in the opening 112a of the first conductive pattern 112, the second conductive pattern 114B of the liquid crystal lens 100B further covers the first conductive pattern 112. The liquid crystal lens 100B has the same efficiency and advantages as the liquid crystal lens 100 does, which are not repeated herein.

Figure 4:
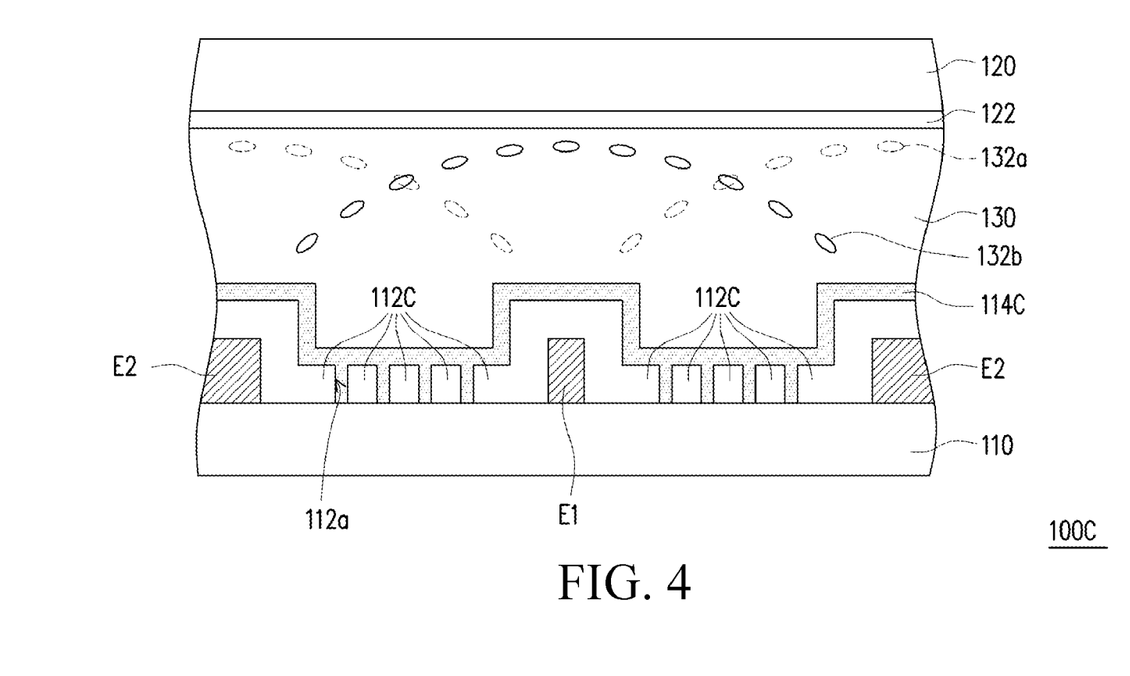
FIG. 4 is a schematic sectional diagram of a liquid crystal lens according to yet another embodiment of the present invention.

FIG. 4 is a schematic sectional diagram of a liquid crystal lens according to yet another embodiment of the present invention. Refer to FIG. 4, a liquid crystal lens 100C in FIG. 4 is similar to the liquid crystal lens 100B in FIG. 3, and therefore, the same or corresponding devices are represented by using the same or corresponding reference numerals. A difference between the liquid crystal lens 100C and the liquid crystal lens 100B lies in that: a resistivity of a first conductive pattern 112C, covering a first electrode E1 and a second electrode E2, of the liquid crystal lens 100C is greater than a resistivity of a second conductive pattern 114C, instead of that the resistivity of the first conductive pattern 112, covering the first electrode E1 and the second electrode E2, of the liquid crystal lens 100B is less than the resistivity of the second conductive pattern 114. This difference will be mainly described below, and for the same parts of the two, refer to the foregoing description according to the reference numerals in FIG. 4, which are not repeated herein.

The liquid crystal lens 100C includes a first substrate 110, the first electrode E1, the second electrode E2, at least one first conductive pattern 112C, second conductive pattern 114C, a second substrate 120, a common electrode 122, and a liquid crystal layer 130. The first electrode E1 and the second electrode E2 are disposed on the first substrate 110. The second electrode E2 substantially surrounds the first electrode E1. The second substrate 120 is disposed opposite to the first substrate 110. The common electrode 122 is disposed on the second substrate 120. The first conductive pattern 112C and the second conductive pattern 114C are disposed on the first substrate 110. The second conductive pattern 114C is disposed into the first conductive pattern 112C. The first conductive pattern 112C and the second conductive pattern 114C are electrically connected to each other. The first conductive pattern 112C and the second conductive pattern 114C are electrically connected between the first electrode E1 and the second electrode E2. The resistivity of the first conductive pattern 112C and the resistivity of the second conductive pattern 114C are greater than a resistivity of the first electrode E1 and a resistivity of the second electrode E2. The resistivity of one of the first conductive pattern 112C and the second conductive pattern 114C is greater than the resistivity of the other of the first conductive pattern 112C and the second conductive pattern 114C.

The first conductive pattern 112 has an opening 112a. In addition to being filled in the opening 112a of the first conductive pattern 112, the second conductive pattern 114C of the liquid crystal lens 100C further covers the first conductive pattern 112. A difference from the embodiment in FIG. 3 is that, the first conductive pattern 112C covers the first electrode E1 and the second electrode E2, and the resistivity of the first conductive pattern 112C is greater than the resistivity of the second conductive pattern 114C. The liquid crystal lens 100C has similar efficiency and advantages to those of the liquid crystal lens 100B, which are no longer repeated herein.

Figure 5:
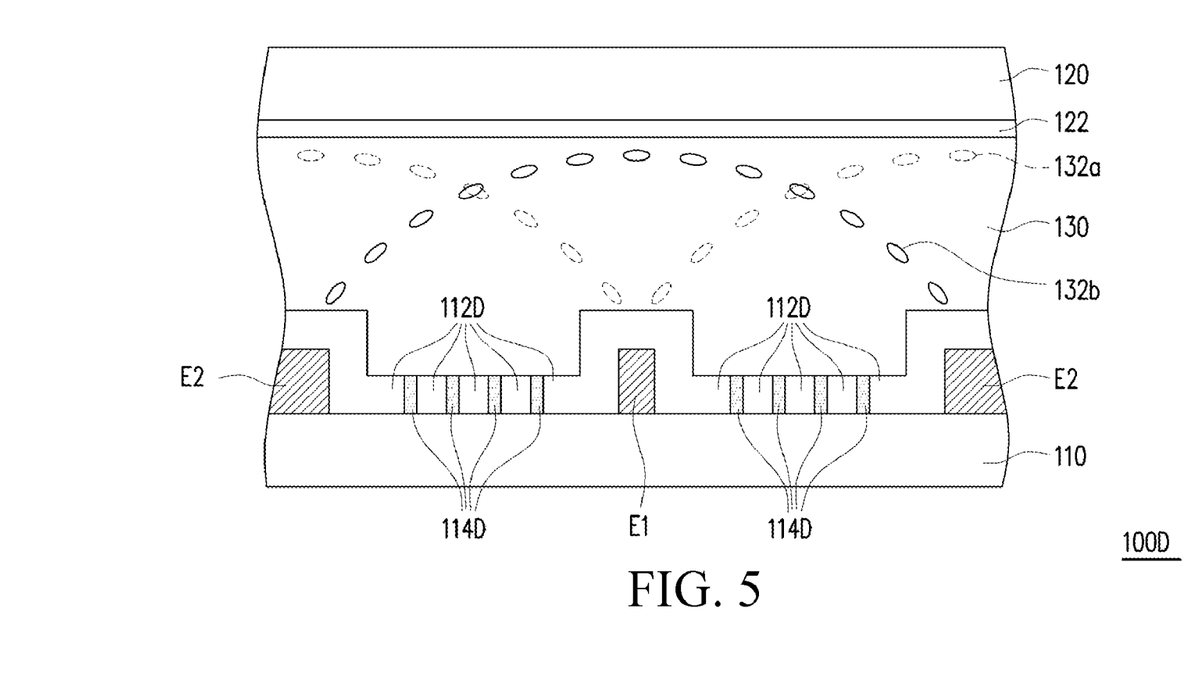
FIG. 5 is a schematic sectional diagram of a liquid crystal lens according to an embodiment of the present invention.

FIG. 5 is a schematic sectional diagram of a liquid crystal lens of an embodiment of the present invention. Refer to FIG. 5, a liquid crystal lens 100D in FIG. 5 is similar to the liquid crystal lens 100 in FIG. 1, and therefore, the same or corresponding devices are represented by using the same or corresponding reference numerals. A difference between the liquid crystal lens 100D and the liquid crystal lens 100 lies in that: the material of a first conductive pattern 112D and a second conductive pattern 114D of the liquid crystal lens 100D is different from the material of the first conductive pattern 112 and the second conductive pattern 114 of the liquid crystal lens 100. This difference will be mainly described below, and for the same parts of the two, refer to the foregoing description according to the reference numerals in FIG. 5, which are not repeated herein.

Refer to FIG. 5, the liquid crystal lens 100D includes a first substrate 110, a first electrode E1, a second electrode E2, at least one first conductive pattern 112D, multiple second conductive patterns 114D, a second substrate 120, a common electrode 122, and a liquid crystal layer 130. The first electrode E1 and the second electrode E2 are disposed on the first substrate 110. The second electrode E2 substantially surrounds the first electrode E1. The second substrate 120 is disposed opposite to the first substrate 110. The common electrode 122 is disposed on the second substrate 120. The first conductive pattern 112D and the second conductive pattern 114D are disposed on the first substrate 110. The second conductive pattern 114D is disposed into the first conductive pattern 112D. The first conductive pattern 112D and the second conductive pattern 114D are electrically connected to each other. The first conductive pattern 112D and the second conductive pattern 114D are electrically connected between the first electrode E1 and the second electrode E2. A resistivity of the first conductive pattern 112D and a resistivity of the second conductive pattern 114D are greater than a resistivity of the first electrode E1 and a resistivity of the second electrode E2. The resistivity of one of the first conductive pattern 112D and the second conductive pattern 114D is greater than the resistivity of the other of the first conductive pattern 112D and the second conductive pattern 114D.

A difference from the embodiment in FIG. 1, one of the material of the first conductive pattern 112D and the material of the second conductive pattern 114D is an N-doped semiconductor, and the other of the material of the first conductive pattern 112D and the material of the second conductive pattern 114D is an undoped semiconductor. For example, in the embodiment in FIG. 5, the material of the first conductive pattern 112D covering the first electrode E1 and the second electrode E2 may be an N-doped semiconductor (for example, the N-doped polycrystalline silicon), and the material of the second conductive pattern 114D distributed in the first conductive pattern 112D may be an undoped semiconductor (for example, undoped polycrystalline silicon). However, the present invention is not limited thereto. In another embodiment, the material of the first conductive pattern 112D covering the first electrode E1 and the second electrode E2 may also be an undoped semiconductor, and the material of the second conductive pattern 114D distributed in the first conductive pattern 112D may also be an N-doped semiconductor. The liquid crystal lens 100D has the same efficiency and advantages as the liquid crystal lens 100 does, which are not repeated herein.

Figure 6:
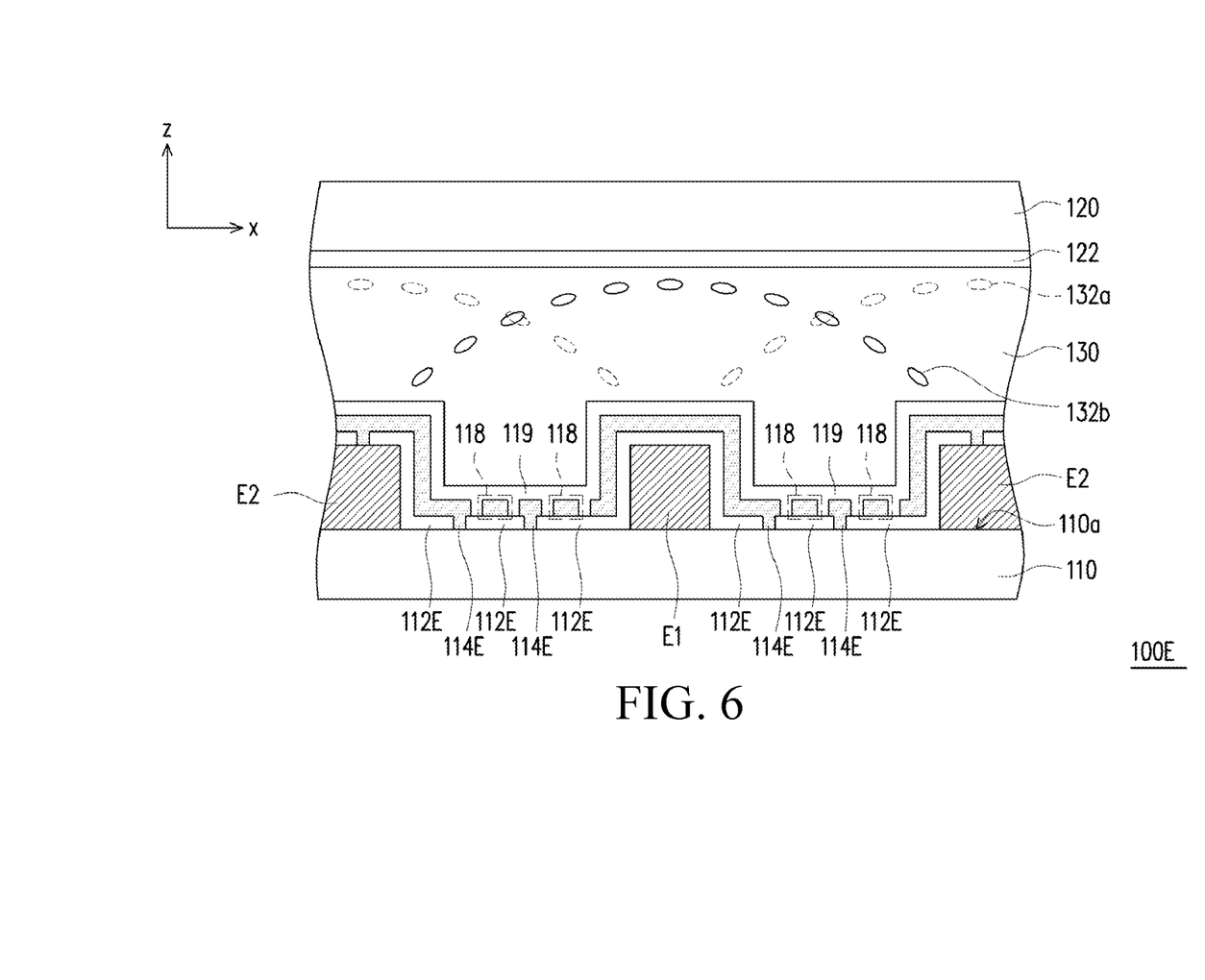
FIG. 6 is a schematic sectional diagram of a liquid crystal lens according to another embodiment of the present invention.

FIG. 6 is a schematic sectional diagram of a liquid crystal lens according to another embodiment of the present invention. Refer to FIG. 6, a liquid crystal lens 100E in FIG. 6 is similar to the liquid crystal lens 100 in FIG. 1, and therefore, the same or corresponding devices are represented by using the same or corresponding reference numerals. A main difference between the liquid crystal lens 100E and the liquid crystal lens 100 lies in that: the liquid crystal lens 100E further includes a third conductive pattern 118 and a fourth conductive pattern 119. This difference will be mainly described below, and for the same parts of the two, refer to the foregoing description according to the reference numerals in FIG. 6, which are not repeated herein.

Refer to FIG. 6, the liquid crystal lens 100E includes a first substrate 110, a first electrode E1, a second electrode E2, at least one first conductive pattern 112E, multiple second conductive patterns 114E, a second substrate 120, a common electrode 122, and a liquid crystal layer 130. The first electrode E1 and the second electrode E2 are disposed on the first substrate 110. The second electrode E2 substantially surrounds the first electrode E1. The second substrate 120 is disposed opposite to the first substrate 110. The common electrode 122 is disposed on the second substrate 120. The first conductive pattern 112E and the second conductive pattern 114E are disposed on the first substrate 110. The at least one second conductive pattern 114E is disposed into the first conductive pattern 112E. The first conductive pattern 112E and the second conductive pattern 114E are electrically connected to each other. The first conductive pattern 112E and the second conductive pattern 114E are electrically connected between the first electrode E1 and the second electrode E2. A resistivity of the first conductive pattern 112E and a resistivity of the second conductive pattern 114E are greater than a resistivity of the first electrode E1 and a resistivity of the second electrode E2. The resistivity of one of the first conductive pattern 112E and the second conductive pattern 114E is greater than the resistivity of the other of the first conductive pattern 112E and the second conductive pattern 114E.

A difference from the embodiment in FIG. 1, the liquid crystal lens 100E further includes the third conductive pattern 118 and the fourth conductive pattern 119 that are disposed on the first substrate 110. The fourth conductive pattern 119 is disposed into the third conductive pattern 118. In this embodiment, the fourth conductive pattern 119 may further cover the third conductive pattern 118. The third conductive pattern 118 and the fourth conductive pattern 119 are disposed on the first conductive pattern 112E. The at least one third conductive pattern 118 is disposed on the first conductive pattern 112E. The fourth conductive pattern 119 is disposed on the second conductive pattern 114E. The first conductive pattern 112E, the second conductive pattern 114E, the third conductive pattern 118, the fourth conductive pattern 119, the first electrode E1 and the second electrode E2 are electrically connected. A resistivity of the third conductive pattern 118 and a resistivity of the fourth conductive pattern 119 are greater than the resistivity of the first electrode E1 and the resistivity of the second electrode E2. The resistivity of one of the third conductive pattern 118 and the fourth conductive pattern 119 is less than the resistivity of the other of the third conductive pattern 118 and the fourth conductive pattern 119.

One of the third conductive pattern 118 and the fourth conductive pattern 119 that has a smaller resistivity and one of the first conductive pattern 112E and the second conductive pattern 114E that has a smaller resistivity are staggered in a direction z. The first substrate 110 has a surface 110a, and the direction z is parallel to a normal direction of the surface 110a. For example, in the embodiment in FIG. 6, the first conductive pattern 112E covers the first electrode E1 and the second electrode E2, and the resistivity of the second conductive pattern 114E may be less than the resistivity of the first conductive pattern 112E. The resistivity of the third conductive pattern 118 may be less than the resistivity of the fourth conductive pattern 119. The second conductive pattern 114E and the third conductive pattern 118 are not overlapped in the direction z. The material of one (for example, the third conductive pattern 118) of the third conductive pattern 118 and the fourth conductive pattern 119 that has a smaller resistivity may be the same as the material of one (for example, the second conductive pattern 114E) of the first conductive pattern 112E and the second conductive pattern 114E that has a smaller resistivity. The second conductive pattern 114E and the third conductive pattern 118 may be formed by a same film layer. In this embodiment, the material of the third conductive pattern 118 and the second conductive pattern 114E may be a metal oxide, for example, an ITO, and an IGZO. The material of the first conductive pattern 112E and the fourth conductive pattern 119 may be an oxide having a low breakdown voltage (in other words, a high leakage current), for example, a low-temperature silicon oxide ($SiO_x$), and a low-temperature nitric oxide ($SiN_x$); however, the present invention is not limited thereto.

For example, the third conductive pattern 118 and the fourth conductive pattern 119 are disposed, so that in a region between the first electrode E1 and the second electrode E2, not only multiple voltage drops may be formed in a direction x pointing to the second electrode E2 from the first electrode E1, but also multiple voltage drops may be formed in the direction z that is staggered with the direction x. Therefore, the distribution of lines of the electric force that are formed in the liquid crystal layer 130 by a voltage difference between the first electrode E1 and the second electrode E2 may be closer to an ideal state, to enable optical axes of liquid crystal molecules 132a, 132b of the liquid crystal layer 130 to be arranged in a designated direction, thereby providing the liquid crystal lens 100E with better optical characteristics.

Figure 7:
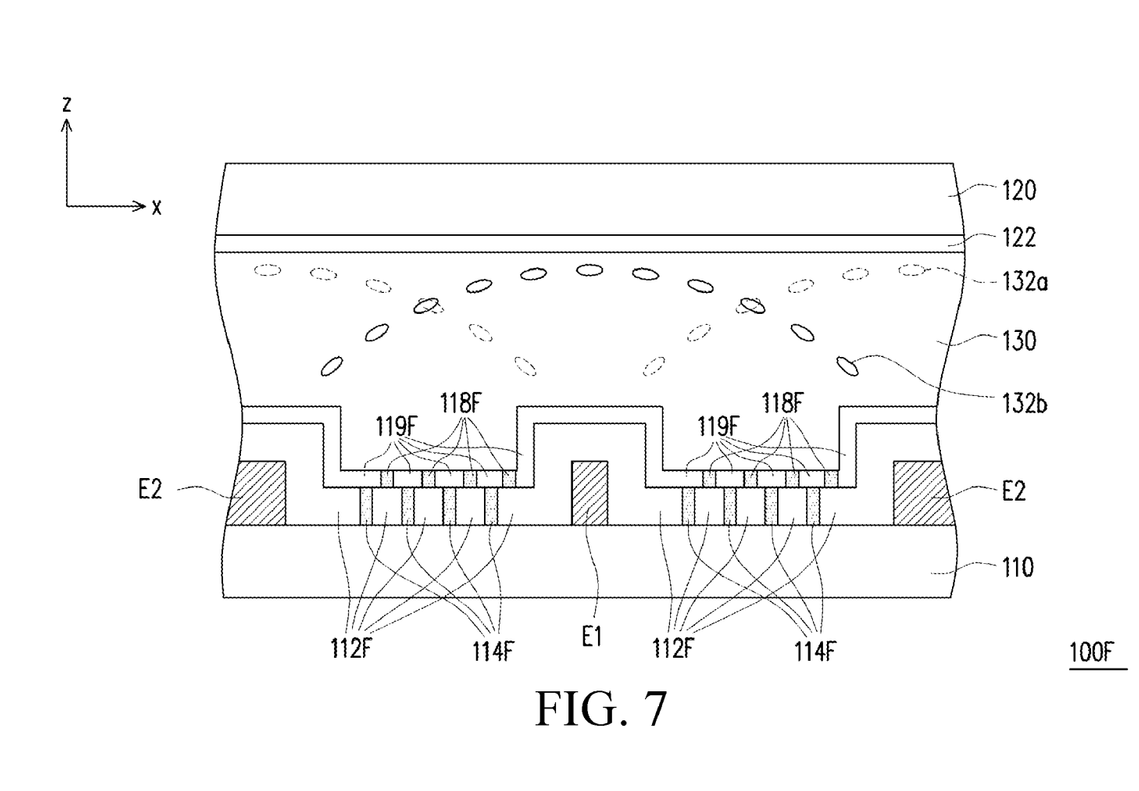
FIG. 7 is a schematic sectional diagram of a liquid crystal lens according to still another embodiment of the present invention.

FIG. 7 is a schematic sectional diagram of a liquid crystal lens according to still another embodiment of the present invention. Refer to FIG. 7, a liquid crystal lens 100F in FIG. 7 is similar to the liquid crystal lens 100E in FIG. 6, and therefore, the same or corresponding devices are represented by using the same or corresponding reference numerals. A main difference between the liquid crystal lens 100F and the liquid crystal lens 100E lies in that: the materials of a first conductive pattern 112F, a second conductive pattern 114F, a third conductive pattern 118F, and a fourth conductive pattern 119F of the liquid crystal lens 100F are respectively different from the materials of a first conductive pattern 112E, a second conductive pattern 114E, a third conductive pattern 118, and a fourth conductive pattern 119 of the liquid crystal lens 100E. The fourth conductive pattern 119F of the liquid crystal lens 100F is different from the fourth conductive pattern 119 of the liquid crystal lens 100E. This difference will be mainly described below, and for the same parts of the two, refer to the foregoing description according to the reference numerals in FIG. 7, which are not repeated herein.

Refer to FIG. 7, the liquid crystal lens 100F includes a first substrate 110, a first electrode E1, a second electrode E2, at least one first conductive pattern 112F, multiple second conductive patterns 114F, a second substrate 120, a common electrode 122, and a liquid crystal layer 130. The first electrode E1 and the second electrode E2 are disposed on the first substrate 110. The second electrode E2 substantially surrounds the first electrode E1. The second substrate 120 is disposed opposite to the first substrate 110. The common electrode 122 is disposed on the second substrate 120. The first conductive pattern 112F and the second conductive pattern 114F are disposed on the first substrate 110. The second conductive pattern 114F is disposed into the first conductive pattern 112F. The first conductive pattern 112F and the second conductive pattern 114F are electrically connected to each other. The first conductive pattern 112F and the second conductive pattern 114F are electrically connected between the first electrode E1 and the second electrode E2. A resistivity of the first conductive pattern 112F and a resistivity of the second conductive pattern 114F are greater than a resistivity of the first electrode E1 and a resistivity of the second electrode E2. The resistivity of one of the first conductive pattern 112F and the second conductive pattern 114F is greater than the resistivity of the other of the first conductive pattern 112F and the second conductive pattern 114F.

The liquid crystal lens 100F further includes the third conductive pattern 118F and the fourth conductive pattern 119F that are disposed on the first substrate 110. The third conductive patterns 118F are disposed into the fourth conductive pattern 119F. The third conductive pattern 118F and the fourth conductive pattern 119F are disposed on the first conductive pattern 112 and the second conductive pattern 114 and are electrically connected between the first electrode E1 and the second electrode E2. A resistivity of the third conductive pattern 118F and a resistivity of the fourth conductive pattern 119F are greater than the resistivity of the first electrode E1 and the resistivity of the second electrode E2. The resistivity of one of the third conductive pattern 118F and the fourth conductive pattern 119F is less than the resistivity of the other of the third conductive pattern 118F and the fourth conductive pattern 119F.

One of the third conductive pattern 118F and the fourth conductive pattern 119F that has a larger resistivity and one of the first conductive pattern 112F and the second conductive pattern 114F that has a larger resistivity are staggered in the direction z. The first substrate 110 has the surface 110a, and the direction z is parallel to a normal direction of the surface 110a. For example, in the embodiment in FIG. 7, the first conductive pattern 112F covers the first electrode E1 and the second electrode E2, and the resistivity of the second conductive pattern 114F may be greater than the resistivity of the first conductive pattern 112F. The fourth conductive pattern 119F covers the first electrode E1 and the second electrode E2, and the resistivity of the third conductive pattern 118F may be greater than the resistivity of the fourth conductive pattern 119F. The second conductive pattern 114F and the third conductive pattern 118F are not overlapped in the direction z.

In the embodiment in FIG. 7, the first conductive pattern 112F and the second conductive pattern 114F may be formed by a same first semiconductor layer. The material of one (for example, the first conductive pattern 112F) of the first conductive pattern 112F and the second conductive pattern 114F may be an N-doped portion of the first semiconductor layer. The material of the other (for example, the second conductive pattern 114F) of the first conductive pattern 112F and the second conductive pattern 114F may be another undoped portion of the first semiconductor layer. The third conductive pattern 118F and the fourth conductive pattern 119F may be formed by a same second semiconductor layer. The material of one (for example, the fourth conductive pattern 119F) of the third conductive pattern 118F and the fourth conductive pattern 119F may be an N-doped portion of the second semiconductor layer. The material of the other (for example, the third conductive pattern 118F) of the third conductive pattern 118F and the fourth conductive pattern 119F may be another undoped portion of second semiconductor layer. For example, the material of the first conductive pattern 112F and the fourth conductive pattern 119F may be an N-doped semiconductor (for example, N-doped polycrystalline silicon), and the material of the second conductive pattern 114F and the third conductive pattern 118F may be an undoped semiconductor (for example, undoped polycrystalline silicon). The liquid crystal lens 100F has efficiency and advantages similar to those of the liquid crystal lens 100E, which are not repeated herein.

Figure 8:
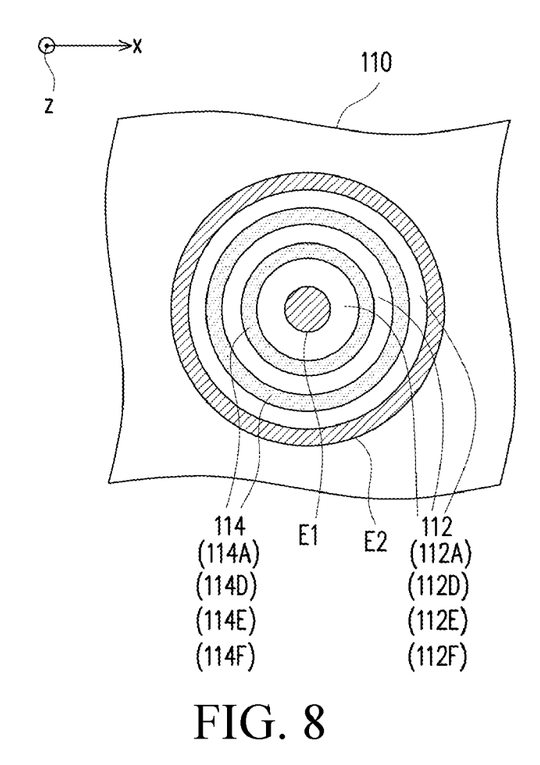
FIG. 8 is a schematic top view of a first conductive pattern and a second conductive pattern according to an embodiment of the present invention.

FIG. 8 is a schematic top view of a first conductive pattern and a second conductive pattern according to an embodiment of the present invention. Refer to FIG. 8, multiple second conductive patterns 114, 114A, 114D, 114E, and 114F may be selectively and evenly distributed between a first electrode E1 and a second electrode E2. Furthermore, in this embodiment, multiple first conductive patterns 112, 112A, 112D, 112E, and 112F and the multiple second conductive patterns 114, 114A, 114D, 114E, and 114F may be multiple concentric circles alternately arranged in the direction x. However, the present invention is not limited thereto. In another embodiment, the first conductive patterns 112, 112A, 112D, 112E, and 112F and the second conductive patterns 114, 114A, 114D, 114E, and 114F may also be arranged in another suitable manner, and FIG. 9 is used as an example for description below.

Figure 9:
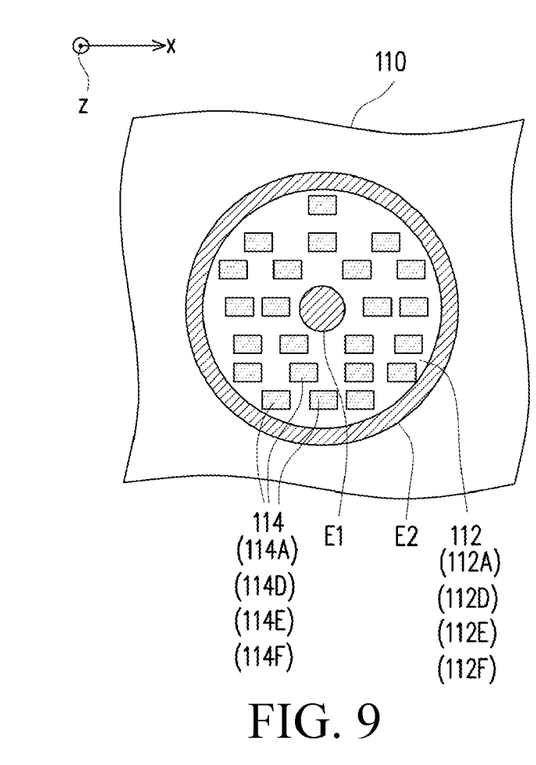
FIG. 9 is a schematic top view of a first conductive pattern and a second conductive pattern according to another embodiment of the present invention.

FIG. 9 is a schematic top diagram of a first conductive pattern and a second conductive pattern according to another embodiment of the present invention. Refer to FIG. 9, the second conductive patterns 114, 114A, 114D, 114E, and 114F may be selectively and randomly scattered between the first electrode E1 and the second electrode E2. The first conductive patterns 112, 112A, 112D, 112E, and 112F may cover the first electrode E1 and the second electrode E2 and gaps between the second conductive patterns 114, 114A, 114D, 114E, and 114F and the first electrode E1 and the second electrode E2.

In the foregoing embodiment, the definition of that the second electrode E2 substantially surrounds the first electrode E1 is that, for example, the second electrode E2 completely surrounds the first electrode E1, the second electrode E2 partially surrounds the first electrode E1 or the second electrode E2 is only disposed corresponding to a small portion of the first electrode E1, and the second electrode E2 may be a closed pattern or an open pattern; however, the present invention is not limited thereto.

In the foregoing embodiments, the definition of that the conductive patterns are staggered in the direction z is that, for example, the conductive patterns do not overlap in the direction z or partially overlap in the direction z; however, the present invention is not limited thereto.

In conclusion, in the liquid crystal lens of the embodiments of the present invention, a first conductive pattern and a second conductive pattern that have high resistance values and different resistivities are electrically connected between a first electrode and a second electrode of the liquid crystal lens. At sides of a conductive pattern having a high resistance, a voltage drop occurs. Therefore, multiple voltage drops may be formed from the first electrode to the second electrode. By using the multiple voltage drops, lines of the electric force that are formed in a liquid crystal layer by a voltage difference between the first electrode and the second electrode may be ideally distributed between the first electrode and the second electrode, instead of being easily limited near the first electrode and the second electrode, thereby providing the liquid crystal lens with desirable optical characteristics.

Although the present invention is disclosed above by using the embodiments, the embodiments are not used to limit the present invention. Any person of ordinary skill in the art can make several variations and modifications without departing from the spirit and scope of the present invention, and therefore, the protection scope of the present invention should be as defined by the appended claims.

What is claimed is:

1. A liquid crystal lens, comprising:
   a first substrate;
   a first electrode, disposed on the first substrate;
   a second electrode;
   at least one first conductive pattern and at least one second conductive pattern, electrically connected between the first electrode and the second electrode, wherein a resistivity of the at least one first conductive pattern and a resistivity of the at least one second conductive pattern are greater than a resistivity of the first electrode and a resistivity of the second electrode, the resistivity of the at least one first conductive pattern is different from the resistivity of the at least one second conductive pattern, at least a portion of the at least one second conductive pattern is disposed into the at least one first conductive pattern, and the at least one first conductive pattern and the at least one second conductive pattern are electrically connected;
   a second substrate, disposed opposite the first substrate; and
   a liquid crystal layer, disposed between the first substrate and the second substrate.

2. The liquid crystal lens according to claim 1, wherein the at least one first conductive pattern covers the first electrode and the second electrode, and the resistivity of the at least one first conductive pattern is less than the resistivity of the at least one second conductive pattern.

3. The liquid crystal lens according to claim 1, wherein the at least one first conductive pattern covers the first electrode and the second electrode, and the resistivity of the at least one first conductive pattern is greater than the resistivity of the at least one second conductive pattern.

4. The liquid crystal lens according to claim 1, wherein the at least one first conductive pattern has at least one opening, and the at least a portion of the at least one second conductive pattern is filled in the at least one opening and covers the at least one first conductive pattern, the first electrode, and the second electrode.

5. The liquid crystal lens according to claim 1, wherein one of the material of the at least one first conductive pattern and the material of the at least one second conductive pattern is an N-doped semiconductor, and the other of the material of the at least one first conductive pattern and the material of the at least one second conductive pattern is an undoped semiconductor.

6. The liquid crystal lens according to claim 1, further comprising:
   at least one third conductive pattern and at least one fourth conductive pattern, wherein at least a portion of the at least one fourth conductive pattern is disposed into the at least one third conductive pattern, the at least one third conductive pattern and the at least one fourth conductive pattern are disposed on the at least one first conductive pattern and the at least one second conductive pattern and are electrically connected between the first electrode and the second electrode, a resistivity of the at least one third conductive pattern and a resistivity of the at least one fourth conductive pattern are greater than the resistivity of the first electrode and the resistivity of the second electrode;
   wherein the resistivity of one of the at least one third conductive pattern and the at least one fourth conductive pattern is less than the resistivity of the other of the at least one third conductive pattern and the at least one fourth conductive pattern; and
   wherein one of the at least one third conductive pattern and the at least one fourth conductive pattern that has a smaller resistivity and one of the at least one first conductive pattern and the at least one second conductive pattern that has a smaller resistivity are staggered, or one of the at least one third conductive pattern and the at least one fourth conductive pattern that has a larger relatively and one of the at least one first conductive pattern and the at least one second conductive pattern that has a larger resistivity are staggered.

7. The liquid crystal lens according to claim 6, wherein the one of the at least one third conductive pattern and each fourth conductive pattern that has a smaller resistivity has same material as one of the at least one first conductive pattern and the at least one second conductive pattern that has a smaller resistivity.

8. The liquid crystal lens according to claim 6, wherein the at least one fourth conductive pattern further covers the at least one third conductive pattern.

9. The liquid crystal lens according to claim 6, wherein the at least one first conductive pattern and the second conductive patterns are formed by a same first semiconductor layer, the material of one of the at least one first conductive pattern and the at least one second conductive pattern is an N-doped portion of the first semiconductor layer, and the material of the other of the at least one first conductive pattern and the at least one second conductive pattern is an undoped portion of the first semiconductor layer; and wherein quantity of the at least one fourth conductive pattern is plural, the at least one third conductive pattern and the fourth conductive patterns are formed by a same second semiconductor layer, the material of one of the at least one third conductive pattern and each fourth conductive pattern is an N-doped portion of the second semiconductor layer, and the material of the other of the at least one third conductive pattern and each fourth conductive pattern is an undoped portion of the second semiconductor layer.

10. The liquid crystal lens according to claim 1, wherein quantity of the at least one second conductive pattern is plural, and the second conductive patterns are evenly distributed between the first electrode and the second electrode.

11. The liquid crystal lens according to claim 1, wherein quantity of the at least one second conductive pattern is plural, and the second conductive patterns are randomly distributed between the first electrode and the second electrode.

12. The liquid crystal lens according to claim 1, wherein the material of the first conductive pattern comprises one of metal oxide, N-doped semiconductor, low-temperature silicon oxide, low-temperature nitric oxide and undoped semiconductor.

* * * * *